Figure 1:
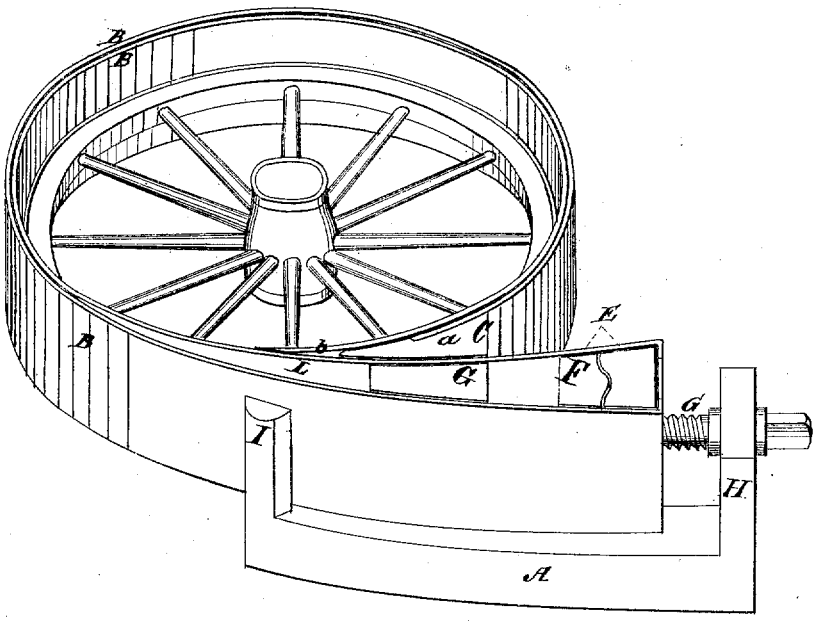

JONATHAN BURNS WEST.

Improvement in Device for Tightening Carriage Tires.

No. 4,836. Reissued March 26, 1872.

*Witnesses:*
S. M. Pool
E. J. McLain

*Inventor:*
Jonathan Burns West,
By E. D. Cozzens,
Atty

AM. PHOTO-LITHOGRAPHIC CO. N.Y. (OSBORNE'S PROCESS.)

UNITED STATES PATENT OFFICE.

JONATHAN BURNS WEST, OF GENESEO, NEW YORK.

IMPROVEMENT IN DEVICES FOR TIGHTENING CARRIAGE-TIRES.

Specification forming part of Letters Patent No. 101,330, dated March 29, 1870; reissue No. 4,836, dated March 26, 1872.

*To all whom it may concern:*

Be it known that I, JONATHAN BURNS WEST, of Geneseo, in the county of Livingston and State of New York, have invented a new and useful apparatus for applying force to compress or "upset" metallic articles in the form of bands, rings, hollow cylinders, or other shapes; and I hereby declare that the following is a full, clear, and exact description thereof, reference being had to the drawing which accompanies and forms a part of this specification.

Figure 3:
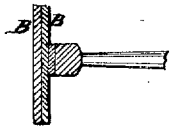
Figure 2:
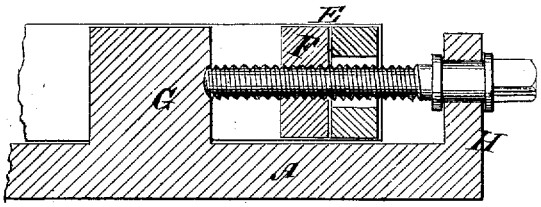

In this drawing, Figure 1 is a top view of a form of my apparatus which I have found to work well in practice. Fig. 2 is a longitudinal section taken through the center of that portion of the apparatus at which the power which operates the same is applied. Fig. 3 is a cross-section of the straps or bands which constitute a part of the apparatus, and also of the tire and felly of a wheel of an ordinary wagon, illustrating the manner in which compression may be applied to such an article by my apparatus.

This invention relates to a simple and readily operated means of applying a powerful compressing force throughout or nearly throughout the exterior area, surface, or periphery of the band or other article operated upon, in such a manner as to drive the atoms or particles composing the mass or body of the article more closely together than they are in their natural state, and thereby diminish the diameter or decrease the bulk of the article. The apparatus in which I embody this invention consists of one or more flexible metallic bands, which surround or encircle the article operated upon, and through which the compressing force is transmitted, in combination with a "head" or resisting-point located at any suitable part of the apparatus, and to which one end of the band or bands is firmly attached, and also with another head or acting-point to which the other end of the band or bands is firmly attached, but which is capable, when power is applied to it, of being drawn away from the resisting-head, so that the flexible compressing-band or bands are caused to rapidly clasp and squeeze more and more tightly and closely, and with more and more compressing power every part of that portion encircled by them of the article operated upon, whereby the atoms or particles constituting the mass or substance of the article are forced nearer together, and its diameter made smaller, in a manner and with a result which effect many useful purposes in the arts.

One of the simplest and most generally applicable of the many uses to which my invention may be put, is that of "setting" the metallic tires of wheels for wagons and other vehicles; and as the construction and operation of my apparatus for this purpose will sufficiently illustrate its nature and its adaptation to other uses, I shall, in this specification, limit myself to describing the manner in which I employ it for compressing or "setting" wheel-tires.

In the drawing, B B represent straps, bands, or strips of any suitable metallic material, such as band-iron of good quality, or steel of a tough, uniform, and homogeneous nature. The dimensions of the band should vary with the character of the tires to be compressed. For tires of wheels for ordinary wagons, I have found that bands about one-tenth of an inch in thickness and about six inches in width will answer a good purpose. For heavier tires, or for tires of harder or tougher material than is used for ordinary wagons, such as steel tires or tires of "compound" iron, thicker and wider bands should be employed, and the number of them should be increased also; but their dimensions and number will readily be determined by any good mechanic accustomed to working in iron, and need not be particularly detailed here. I would, however, recommend that the bands collectively should be at least three times as heavy or thick as is the tire which is to be operated upon. There may be one or several of the bands, but I generally prefer to use two or four of them, and when I do so they are placed in the apparatus side by side and in contact with each other, or quite close together, as shown in the drawing, in order that they may all act substantially as one band. The use of two or more of these bands imparts to them greater flexibility for a given strength, and consequently greater capacity to adapt themselves to the surface of the article compressed, than a single band having a thickness equal to the aggregate thickness which the several bands would possess, while at the same time the capacity to transmit the applied power through them is in no way diminished. Moreover, each band, by being thin, fits closely under the tension to which it is subjected, and although each is independent, yet all act as one in the compressing operation. A is a casting, of greater or less size and strength, according to the character of the work required of the apparatus. This casting constitutes a bed-piece or foundation for the support of the resisting-"head" and the acting-"head," and is usually mounted upon legs. The resisting-head is shown at C. It is of any convenient height and size to give it the requisite strength to resist the strain of the bands upon it when power is applied to them, and it is preferably cast in one piece with the bed-plate; or it may be otherwise firmly secured to the latter. To any suitable part of this head, preferably at *a*, in the drawing, one end of the band or bands is strongly attached, so that they cannot part from the head when they are under strain in the use of the apparatus. To cause as little break as possible in the bearing of the bands upon the tire at the point where they are thus secured to the head, the extremity of that end of the band which is fastened to the head, or if there be, for example, two bands, the extremity of the inner band is preferably allowed to project somewhat beyond the head, as seen at *b*, and is also made thin or wedge-shaped where it so projects, in order that it may as nearly as possible vanish into the circle formed by the residue of the band or bands. The outermost of the bands, if there be more than one, may preferably be recessed or sunk into the head, so that it may be in contact with the inner band. This mode of attachmont also gives greater strength to the head itself. E is the acting-head. To it is firmly secured, by bolts or in any convenient manner, the end of the band or bands furthest from the resisting-head; or, when two or more bands are employed, one of the ends of each of them may be bent around the acting-head, as shown in the drawing, and then they may be further bent to form the ring to encircle the tire, and their other ends should next be fastened to the resisting-head. This will be found the best mode of construction in practice. This acting-head is moveable, and is capable of being drawn away from the resisting-head to any desired extent, thereby drawing the band or bands more and more tightly around the object which they encircle. It is evident that any preferred means may be employed for operating the acting-head to draw it away from the resisting-head, and any power—whether manual, or steam, or hydraulic power—may be applied for the purpose. The means shown in the drawing consist of a screw worked by a winch, or it may be operated by other means familiar to mechanics. H is a fixed post at or near one end of the bed-plate, which supports the screw. This screw should preferably run through and turn loosely in the acting-head E, as shown, without being threaded into it. After passing through the latter, it preferably also passes through and is threaded into a moveable nut, F, placed in front of the acting-head, so that as the nut is worked or forced forward or backward by the application of the power the acting-head will also be forced forward or backward, and thus will powerfully tighten the bands upon the tire or other object encircled by them. It is also obvious that by moving the acting-head forward or backward, the circle formed by the bands may be adapted to tires or other articles of varying diameters within the range of any given size of the apparatus. In the form of the apparatus shown in the drawing, G is another fixed post, against which works the end of the screw opposite to that at which the power is applied, so that it receives the strain of the screw when the apparatus is in use. I is a guide, which aids in keeping the bands in proper position and direction to preserve their contact with the tire or other article operated upon when they are drawn backward or forward.

It will be found preferable, in the use of the apparatus, to cause the band or bands to pass on each side of a wedge-shaped block or guide, L, which may be cast in one piece with the bed-plate, or be otherwise secured to it. This block keeps the bands at a suitable distance apart, and also in proper relation to each other and to the acting-head and point of application of the power, so that the most effective leverage can be exerted upon the head and bands to draw them away from the resisting-head, and so that the bands themselves will be drawn in the best direction to resist undue strain and to produce the desired result. If preferred, however, the band or bands may be secured to the acting-head in any other convenient manner than that represented in the drawing, and the block L or its equivalent may be dispensed with.

If, now, in an apparatus constructed and arranged as described, a wagon-tire or other hoop, band, or ring of metal be placed in a cold state within the circle formed by the bands B B, and power be applied to tighten the bands upon the tire or other article and to powerfully compress it, it will be found, when the operation, which will ordinarily require only a few moments, is completed, that the substance of the metal of the tire or other article has been compacted or "upset," and the atoms or particles forced more closely together than they previously were, so that the entire tire or other article is made of smaller diameter, and bound or "set" firmly upon the wheel or other body over which it was placed.

In practice, the tire, or other hoop, band, or ring will usually be operated upon by the apparatus for the purpose of being compressed or tightly set upon some other body—such as in the case of a wagon or other wheel-tire or band, the wheel itself—and will thereby be abundantly supported against any possible danger of collapsing or "buckling" during the compression. But the "upsetting" would take place without "buckling," even if no support at all be employed.

When this apparatus is employed for setting tires upon wheels, it will be found that the work can be done not only while the tire is on the wheel, whether in the case of a new wheel or of an old wheel the tire of which has become loose by wear or other cause, thereby saving largely in time, labor, and expense; and it also prevents the marring of the paint, and the burning and disfiguring of the wheel, which constantly occurs in the old mode of setting such tires.

It is obvious that, instead of bands or straps, any equivalent tightening devices might be employed.

This apparatus, when constructed of proper strength, and operated preferably by steam or other analogous power, may be used to set the heaviest tires upon wheels, and it is also applicable for setting the tires of car-wheels and of locomotive driving-wheels, for compressing bands upon the hubs of water or other wheels, or upon cylinders or other parts of machinery, and also for banding or "hooping" guns and many other articles.

Having thus described my invention, what I claim as new, and desire to secure by Letters Patent, is—

1. The method herein described, of compressing tires on wheels without removal and without heating, by placing the wheel with the tire thereon within an inclosing band or bands, or equivalent, and applying power to the latter to force the tire to the wood, substantially as specified.

2. In a machine for compressing tires or analogous rings, I claim, in contradistinction to a chain, a band or bands, which receive the tire or analogous ring within its circle and compresses or "upsets" the same, by power applied to the band or bands, as herein set forth.

JONATHAN B. WEST.

Witnesses:

A. J. DE LACY,

T. B. BEECHER.